Sept. 1, 1936.  C. H. PITCHER  2,052,940

FLOWER HOLDER

Filed Aug. 22, 1935

INVENTOR:
CLIVE HENRY PITCHER.
BY H. F. Woodward
ATTORNEY.

UNITED STATES PATENT OFFICE 2,052,940

FLOWER HOLDER

Clive Henry Pitcher, Detroit, Mich.

Application August 22, 1935, Serial No. 37,407

2 Claims. (Cl. 47—41)

This invention relates to flower holders for cemetery lots.

The principal object of the invention is to form such a holder of two members, one of which will be permanently embedded in the soil and the other of which will be readily removable from the embedded member and which will serve as a container for water and will receive and hold therein the stems of flowers.

Another object of the invention is to so construct the holder that, while only a portion of it projects above the surface of the soil, it will be of such depth as to readily accommodate flowers having long stems.

A further object of the invention is to so construct the holder that it will possess great strength and durability yet be ornamental in character and present a neat and attractive appearance.

With these and other objects in view as will hereinafter be brought out, the invention consists, in general, of the structural characteristics, arrangement of parts and combinations of elements illustrated in the accompanying one sheet of drawing, described in the following specification and specifically set forth in the appended claims.

In the drawing, wherein like characters of reference serve to identify like parts in the several views, Figure 1 is a top plan view of the flower holder constructed in accordance with the present invention.

Figure 1:
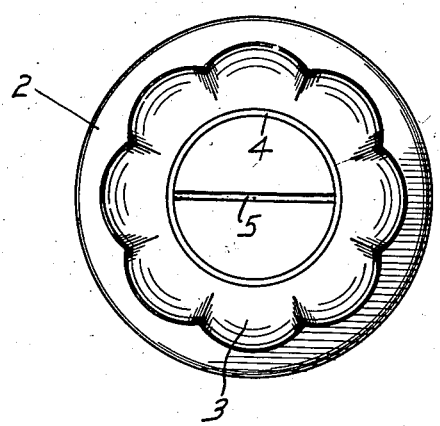

The device consists, broadly, of two members one of which is adapted to be removably contained within the other. The outer member is to be preferably molded of concrete and comprises a depending lower member 1, a central outwardly extending flange member 2 and a projecting upper member 3. The lower member 1 is to be embedded in the soil, the central member, which has a flat under face, rests upon the surface of the soil to determine and limit the depth of embedding, and the upper member 3 is in full view above the ground.

The inner member is in the form of a can 4, preferably metallic, which fits within a central well in the outer member, snugly, and is for the purpose of containing water and receiving the stems of the flowers. In order to facilitate the insertion and removal of the can 4 it is preferably equipped with a diametrically extending transverse bar 5 at or adjacent its open end. This bar may be grasped by the fingers when inserting or removing the can from the outer structure. The bar also serves, in a measure, as a support, midway of their length, for the flower stems.

Figure 2:
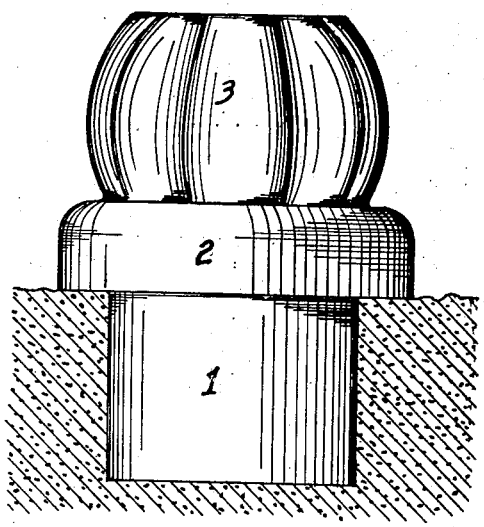
Figure 2 is a side elevation of the same, illustrating the manner in which it is embedded in the soil.
Figure 3:
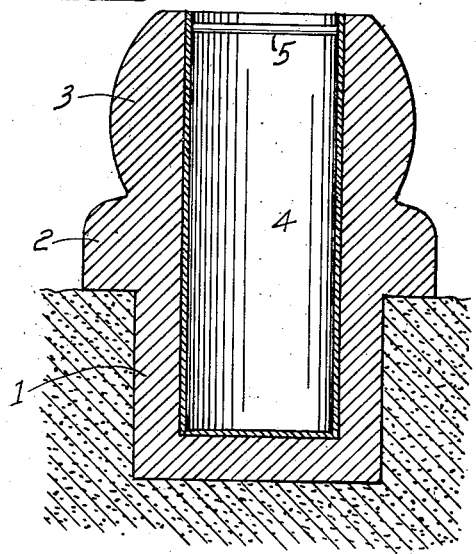
Figure 3 is a vertical section thereof.
Figure 4:
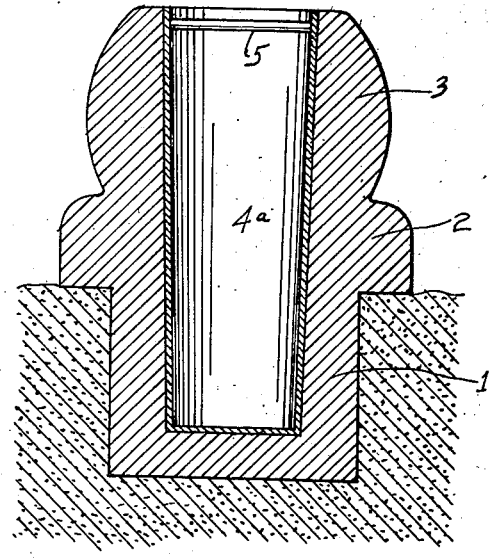
Figure 4 is a view similar to Figure 3 but illustrating a certain modification of the invention.

While the can and the well in which it is placed are preferably of cylindrical contour, as shown in Figures 1, 2, and 3, it might be desired, in certain cases, to have them of tapered contour, as shown in Figure 4, to provide for easier insertion and removal and prevent sticking.

A flower holder as shown and described will possess great strength and durability and offer resistance to deterioration from the weather. It will be practically a permanent structure. The inner can can be quickly and easily removed for the cleaning and refilling and as readily restored to place. When the can is removed no loose soil can fall into the well to hinder proper return of the can. When in place, the can is entirely surrounded by concrete and will not become covered with mud nor will it be subjected to the destructive action of chemicals in the soil.

In the winter the can may be filled with sand or pebbles and serve as a container for artificial flowers.

While I have herein disclosed and illustrated one precise embodiment of the invention it is understood that justifiable modification if necessary during any probable further development for the market will fall within the scope of what is claimed as general principle, involving the structural intention of the discovery.

Having thus described my invention, what I claim as new is:

1. A flower holder consisting of an outer member having a central cylindrical well, and a cylindrical metal receptacle removably contained within said well, the said outer member comprising a lower section adapted to be embedded in the soil, an outwardly extending intermediate section having a flat under face adapted to rest against the surface of the soil, and a projecting upper member thereabove.

2. A flower holder consisting of an outer member having a central cylindrical well, and a cylindrical metal receptacle adapted to fit closely in the cylindrical well, the outer member being flat on its bottom side, and the outer member comprising a lower section adapted to be embedded in the soil, an outwardly extending intermediate section having a flat under face adapted to rest against the surface of the soil, and a projecting upper member thereabove.

CLIVE HENRY PITCHER.